Patented May 10, 1927.

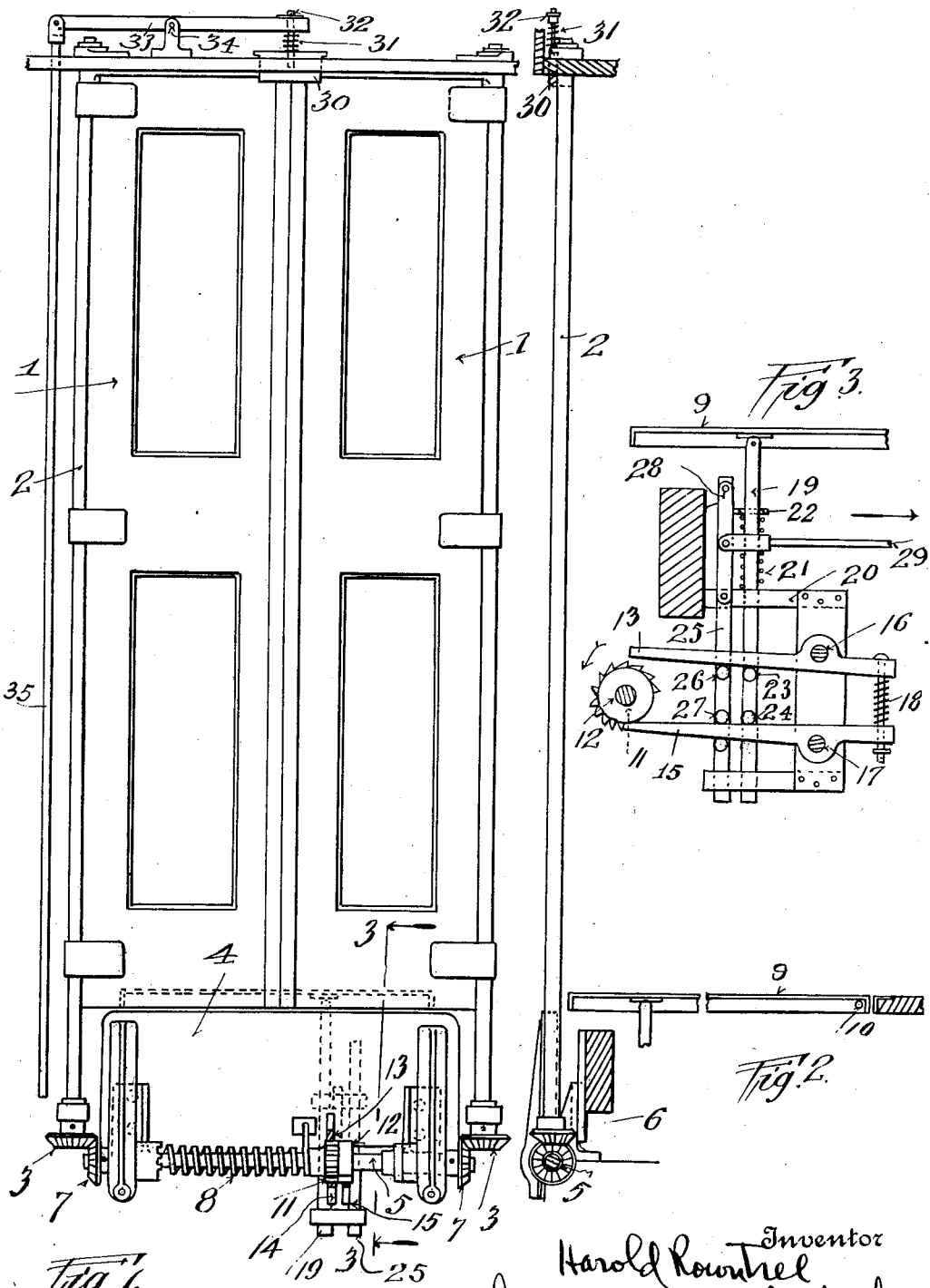

1,627,749

UNITED STATES PATENT OFFICE.

HAROLD ROWNTREE, OF SCARSDALE, NEW YORK, ASSIGNOR TO NATIONAL PNEUMATIC COMPANY, OF NEW YORK, N. Y., A CORPORATION OF WEST VIRGINIA.

MANUALLY-OPERABLE DOOR AND STEP.

Application filed January 10, 1925. Serial No. 1,572.

This invention is a treadle operated door and step for cars, buses and other public vehicles and is designed for use particularly in cars and vehicles wherein power is either not available or it is not desired to use power to operate the exit door.

The object of the invention is to provide a structure wherein the door and step, while normally locked in closed position, are adapted to be opened to permit the exit of a passenger by force applied by the passenger intending to leave the car. The arrangement is such, however, that the opening of the door or the folding down of the step can be precluded by the driver or motorman until such time as it is safe to permit the door to be opened, and provision is also made to positively preclude the opening of such door from the outside thereof.

An important feature of the invention resides in the fact that the door is manually opened by the passenger wishing to leave the car and the motorman or driver is not called upon to expend appreciable power in effecting the opening of the doors as is now generally the case where the doors are manually opened by such operator.

In one of its preferred practical forms, a pair of folding hinged doors are employed and are so connected to the step that through the employment of a spring, the doors are normally closed and the step folded into a vertical position. A pawl and ratchet mechanism cooperates with these moving parts and serves to normally lock the door in a closed position. This pawl and ratchet mechanism is, however, under the joint control of the driver or motorman and the passenger wishing to leave the car, so that while the passenger actually effects the opening of the door, he cannot do so unless the car operator unlocks the parts to permit of their operation by the passenger.

The arrangement is unusually simple, is highly efficient and the parts are so arranged that they will not get out of order and will function through long periods without requiring any maintenance attention whatsoever.

Features of the invention, other than those specified, will be apparent from the hereinafter detailed description and claims, when read in conjunction with the accompanying drawings.

The invention consists substantially in the construction, combination, location and relative arrangement of parts, all as will be more fully hereinafter set forth, as shown by the accompanying drawings and finally pointed out in the appended claims.

Figure 1 is a front elevation of a door and step arrangement embodying the present invention.

Figure 2 is a side elevation of the construction shown in Figure 1 with certain parts omitted in the interest of clearness and the treadle shown in section; and, Figure 3 is a section on the line 3—3 of Figure 1.

Referring to the drawings 1—1 designates a pair of folding hinged doors, each half of the door being hinged on a vertical shaft 2, and to the lower end of each of these shafts is affixed a bevel gear 3. A folding step 4 is positioned under the lower edge of the door and is mounted on a horizontal shaft 5 journalled in brackets 6 and to the ends of which shaft are affixed bevel gears 7 meshing with the gears 3.

A spiral spring 8 is coiled about the shaft 5 and is of sufficient strength to normally raise the step and at the same time close the doors. On the inside of the door a treadle 9 is pivoted as at 10 and is capable of slight pivotal movement.

On the step shaft 5 are firmly affixed two ratchet wheels 11 and 12, having teeth thereon. The ratchet wheel 11 may have a full complement of teeth extending wholly around its circumference or only partly around as shown, while the ratchet wheel 12 is provided with but a single tooth. It will be noted that the teeth on ratchet 11 have one half pointing in the opposite direction to the other half.

With these ratchet wheels cooperate three pawls 13, 14 and 15. The pawl 13 cooperates with the top of the ratchet wheel 11, the pawl 14 cooperates with the bottom of the same ratchet wheel and the pawl 15 cooperates with the bottom of the ratchet wheel 12. These pawls are pivoted on fulcrums 16 and 17, and a spring 18 interposed between their after ends of the pawls 13 and 14 serves to force the pawls in the direction of the ratchet wheels. The arrangement is such that the pawl 13 when in engagement with the ratchet wheel 11 will lock the door against closing, while the function of the pawls 14 and 15 is to lock the door against opening.

Positioned beneath the treadle 9 is a push rod 19 suitably guided in the bracket 20 on which the fulcrums 16 and 17 are carried, and a spring 21, coiled about this push rod and bearing against a fixed collar 22, forces the rod against the under side of the treadle and normally elevates the treadle into horizontal position. This push rod 19 carries two lugs 23 and 24 which extend in a lateral direction and into cooperative relation with certain of the pawls. That is to say, the lug 23 extends beneath the pawl 13, while the lug 24 extends above the pawl 14. Under normal conditions the spring 21 will raise the push rod into the position shown in Figure 3 to lift the pawl 13 free from its cooperating ratchet and to permit the pawl 14 to engage with said ratchet. If weight, however, is imposed upon the treadle to overcome the spring 21, the rod will move the lug 23 into a position to permit the pawl 13 to engage with the ratchet wheel 11 and at the same time will move the lug 24 to disengage the pawl 14 from the ratchet wheel 11, so that so far as these pawls are concerned the door will be permitted to open and the step to fold down, whereas any attempt to close the door after being fully or partially opened will be precluded by the pawl 13.

A second vertical rod 25 also guided for movement in the bracket 20, carries two lugs 26 and 27, the former of which engages the under side of the pawl 13 and the latter of which engages the upper side of the pawl 15.

To the upper end of the rod 25 is attached a toggle 28, the lower end of which is pivotally secured to the rod 25 and to the elbow of which toggle is secured a control rod 29. The upper end of the toggle is pivoted to a fixed point at 28. This control rod is connected to the motorman's or driver's control lever, so that such operator can manually flex the toggle for the purpose of imparting vertical movement to the rod 25. A push on the control rod 29 will, obviously, expand the toggle and lift the rod 25, thereby disengaging the pawl 13 from the ratchet wheel 11 and engaging the pawl 15 with the ratchet wheel 12. The single tooth on the ratchet wheel 12 is located to be engaged by the pawl 15 when the door is in closed position, and the step lifted so that, as long as this engagement between the parts exists, the door is locked against closing. The parts are so connected that this will be the normal position.

Any attempt, therefore, to open the doors while the car is in motion or while, for any other reason, it is desired to preclude such opening, will be unsuccessful. However, in order to relieve the single tooth of the ratchet wheel 12 from undue strain, means is preferably provided for a direct locking of the door. Thus at the upper part of Figures 1 and 2, I have shown a locking bolt 30 adapted to be normally impelled by a spring 31 to overlie the upper margins of both door sections to lock them in closed position.

With the stem 32 of this bolt cooperates a lever 33 pivoted at 34 and to the other end of which lever is connected to a link 35 which, in turn, is connected in any suitable manner with the motorman's or driver's control lever to which the control rod 29 is also secured, so that when the toggle is in a position to lock the step against folding down, the bolt 30 will be in a position to lock the doors against opening. It will be noted, however, that the locking bolt has a bevelled edge so that the door sections can pass under the bolt during closing movement, while the opposite face of the bolt is sheer to positively engage the door sections against opening.

The operation of the parts is as follows.

Let it be assumed that the door is closed and locked, that the step is locked in upright position, that the operator's control lever is in a position to effect this result and that no one is standing on the treadle. The upper pawl 13 is thus held free by both the lugs 23 and 26 and both lower pawls 14 and 15 are locking the parts against operation.

Now if someone, wishing to leave the car, steps on the treadle, the treadle will be forced down, carrying with it, the lower pawl 14. The parts will still, however, be locked in position since both the upper pawl 13 is maintained in elevated relation and the lower pawl 15 still engaged with the single tooth of the ratchet 12 for the reason that the operator's control lever is holding the rod 25 in raised position. The door therefore remains locked at both top and bottom even though a passenger should attempt to open it.

After the motorman or driver has stopped the car, however, movement of his door control lever depresses the rod 25 thereby releasing the pawl 15 from the single tooth of its cooperating ratchet and simultaneously the locking bolt 30 is actuated through the connections described to unlock the door at the top. Inasmuch as both the door and step are unlocked, the passenger waiting on the treadle can shove open the door and inasmuch as the door and step are geared together the step will be lowered as the door is opened. The pawl 13 will ride over the teeth of the ratchet wheel 11 as the door is opened, but at any point that the door stops, this pawl will engage with said ratchet wheel and lock the door against closing, so long as a passenger remains on the treadle. Under normal operation, the door will be shoved wide open and the passenger upon stepping from the treadle will impose his weight upon the step and thus hold the step in lowered position until the passenger descends to the ground. If there is no second passenger following the first, then the treadle will raise as soon as the first passenger has removed his weight therefrom but the door will not shut so long as the passenger remains on the step since his weight will overcome the tension of the spring 8. However, as soon as the passenger leaves the step, and assuming that no second passenger is standing on the treadle, the spring 8 will force the step up and close the door and this is made possible by the fact that the elevation of the treadle will lift the pawl 13. If someone on the outside attempts to grab the door and pull it open, they will be unable to do so as the pawl 14 will have raised with the treadle to engage with the ratchet wheel 11. In practice, the door and step move quickly in closing and this makes it practically impossible for anyone to enter by this means.

If, when the first passenger reaches the step, a following passenger is standing on the treadle, then the upper pawl still remains in its lowered position and therefore when the first passenger steps off of the step, the doors will not attempt to close but will remain locked open and this condition will continue so long as a stream of passengers continue to leave the car or vehicle, but the moment the last one steps off the step the doors will be snapped shut and be locked shut.

Whenever the operator so desires, that is when he notices that all of the passengers have left the car that desire to do so, or when he is anxious to start the car, he will move his control lever and thereby raise the upper pawl which has prevented the door from closing, if this upper pawl has not already been raised, and at the same time he will bring the lower pawl 15 into position to engage the tooth of its ratchet as soon as the door is closed.

Even if someone is standing on the treadle at the moment, the doors will close although, of course, this could not happen if anyone was actually standing on the step, but standing on the treadle will not prevent the doors from closing as the upward motion of the lug 26 raises the upper pawl free from its ratchet so that the door is no longer locked open. As soon as the door reaches its fully closed position, it is locked by the lower pawl 15 engaged in the single tooth of the ratchet 12.

If a passenger is about to pass through the doors when the doors start to close and resents the closing of the doors and catches them before they are fully closed, as, for example, by putting his foot between them and shoving down forcibly on the step, the doors may be forced open without doing any damage to the construction, since the doors are not actually locked against opening so long as the passenger's weight is on the treadle and the rod 25, which is controlled by the operator or attendant, is raised. Breaking strains on the ratchet wheel 12 are precluded during such an emergency by cutting away all but one tooth of the ratchet wheel 12 as described. It will be apparent, however, that the doors cannot be forced open if no one is standing on the treadle, as they will be locked against such movement by the pawl 14 and ratchet wheel 11, and accordingly no one outside of the door can open these doors.

It will be apparent from the foregoing detailed description of the invention that the arrangement is very simple in construction and embodies parts which will wear indefinitely and will not be apt to get out of order. The construction is such, moreover, that the door may be said to be doubly locked in closed position. That is to say, it is locked in position by means operable by a passenger and which, when actuated, through the passenger's act of stepping on the treadle effects a partial unlocking of the door. A further unlocking, or completion of the unlocking operation, is effected by the attendant, so that the door cannot be opened or the step lowered except through conjoint operations of the passenger and attendant. Thus a passenger actually furnishes the power for opening a door after having partially unlocked it, but the final unlocking of the door is at all times under the control of the attendant so that passengers cannot possibly leave the car until the attendant desires to have them do so. The device is thus thoroughly safe when applied to common carriers and will effectually preclude the alighting of passengers from the car while the car is in motion, since, under ordinary conditions, the attendant will not unlock the door until the car is at rest.

An important practical feature of the invention resides in the fact that the installation may be readily made on conventional cars already equipped with folding doors and pivoted step without necessitating an entire rebuilding of the forward part of the car or the cutting away of structural elements of the car body.

While I have shown and described various structures and arrangements embodying the principle of my invention, I wish it to be understood that my broad invention, as defined in the claims is not limited or restricted to any specific arrangement or to any detail thereof, as it is obvious that many modifications and changes in detail will readily occur to those skilled in the art without departing from the spirit of my invention.

Therefore, having now set forth the objects and nature of my invention, and having shown and described an operative structure embodying the principles thereof, what I claim as new and of my own invention, and desire to secure by Letters Patent is:

1. In an assembly of the character described, the combination with a door and a hinged step adapted to be manually operated and connected for conjoint operation, of means for locking the door in closed and the step in raised positions, said locking means being releasable through conjoint acts of a passenger and the attendant.

2. In an assembly of the character described, the combination with a door and a hinged step adapted to be manually operated and connected for conjoint operation, of means, releasable by a passenger, for locking the door in closed and the step in raised positions, and means, releasable by the attendant, for locking the door in closed and the step in raised positions, whereby the door can only be opened and the step lowered after both the passenger's and attendant's locking means have been respectively operated.

3. In an assembly of the character described, the combination with a door and a hinged step adapted to be manually operated and connected for conjoint operation, of means for locking the door in closed and the step in raised positions, means operable by a passenger for paritally unlocking the door and step, and means operable by the attendant for completing the unlocking of the door and step to permit the passenger to open the door and lower the step.

4. In an assembly of the character described, the combination with a door and a hinged step connected for conjoint operation, of means for locking the door in closed and the step in raised positions, treadle actuated means operable by a passenger to partially unlock the door and step for operation, and means operable by the attendant for completing the unlocking of the door and step to permit the door to be opened and the step to be lowered by a passenger standing on the treadle.

5. In an assembly of the character described, the combination with a door and a hinged step connected together for conjoint operation, double locking means for locking the door in closed and the step in raised positions, a treadle adapted, when weight is imposed thereon, to unlock one part of the locking means, and means controlled by the attendant to unlock the other part of the locking means to thereby permit the passenger standing on the treadle to open the door and lower the step.

6. In an assembly of the character described, the combination with a door provided with an operating shaft, a treadle provided with an operating shaft, and connections between said operating shafts to connect the door and treadle for conjoint operation, of pawl and ratchet mechanism cooperating with one of said shafts, and operable conjointly by a passenger and the attendant to release the shaft and permit of the opening of the door and the lowering of the step.

7. In an assembly of the character described, the combination with a door provided with an operating shaft, a treadle provided with an operating shaft, and connections between said operating shafts and connecting the door and treadle for conjoint operation, of ratchets fixed on the shaft, a treadle on which a passenger is adapted to stand when desirous of leaving the vehicle with which the assembly is associated, a pawl cooperating with one ratchet and operatively connected to the treadle to be moved into ineffective position when weight is imposed on the treadle, a pawl cooperating with the other ratchet, and means operable by the attendant to move said latter pawl into ineffective relation to this ratchet.

8. In an assembly of the character described, the combination with a door provided with an operating shaft, a treadle provided with an operating shaft, connections between said operating shafts to connect the door and treadle for conjoint operation, and a spring for normally forcing the door into closed position and the step into raised position, of means for locking the door and step in these positions, said locking means being releasable through conjoint acts of a passenger and the attendant.

9. In an assembly of the character described, the combination with a door provided with an operating shaft, a treadle provided with an operating shaft, connections between said operating shafts to connect the door and tradle for conjoint operation, and a spring for normally forcing the door into closed position and the step into raised position, of means for locking the door in closed and the step in raised positions, treadle actuated means operable to partially unlock the door and step when a passenger's weight is imposed on the treadle, and means operable by the attendant for completing the unlocking of the door and step to permit the door to be opened and the step to be lowered when the passenger exerts enough pressure against the door to overcome the tension of the spring.

10. In an assembly of the character described, the combination with a door having an operating shaft, a hinged step also having an operating shaft, and connections between said shafts for rendering them conjointly operable, of a treadle adjacent the inside of the door, locking means cooperating with one of said shafts to normally lock the step in raised and the door in closed positions, connections between said locking means and the treadle to effect the unlocking of said means when weight is imposed on the treadle, and additional locking means associated with one of the shafts to normally lock the door in closed and step in raised positions, said latter locking means being manually releasable by the attendant.

11. In an assembly of the character described, the combination with a door having an operating shaft, a hinged step also having an operating shaft, and connections between said shafts for rendering them conjointly operable, of a treadle adjacent the inside of the door, means, releasable by a passenger for locking one of the shafts against rotation to preclude the opening of the door or the corresponding movement of the step, and means releasable by the car attendant for locking one of said shafts and for also locking the door against door opening movement.

12. In an assembly of the character described, the combination with a door having an operating shaft, a hinged step also having an operating shaft, and connections between said shafts for rendering them conjointly operable, of a spring on one of said shafts for normally closing the door and elevating the step, a plurality of pawl and ratchet locking devices associated with one of said shafts, a treadle positioned interiorly of the door, operative connections between the treadle and certain of said locking devices to condition them to unlock the door for door opening movement and to lock the door against closing movement so long as weight is imposed on the treadle, and means operable by the attendant and controlling certain of the locking devices to release the door for opening movement when in one position and to lock the door against opening movement when in another position.

13. In an assembly of the character described, the combination with a door having an operating shaft, a hinged step also having an operating shaft, and connections between said shafts for rendering them conjointly operable, of a spring on one of said shafts for normally closing the door and elevating the step, a plurality of pawl and ratchet locking devices associated with one of said shafts, a treadle positioned interiorly of the door, operative connections between the treadle and certain of said locking devices to condition them to unlock the door for door opening movement and to lock the door against closing movement so long as weight is imposed on the treadle, means operable by the attendant and controlling certain of the locking devices to release the door for opening movement when in one position and to lock the door against opening movement when in another position, a locking bolt for directly locking the door in closed position, and means connecting said locking bolt to said manually operable means, whereby the bolt is withdrawn to unlock the door when the attendant unlocks the shaft.

14. In an assembly of the character described, the combination with a door, of means for locking the door in its closed position, a passenger treadle, means for releasing said lock through the conjoint act of the passanger treadle and an operator, and means for locking the door against closing as long as a passenger is on the treadle.

15. In an assembly of the character described, the combination with a door, of means for locking the door in its closed position, a passenger treadle, means for releasing said lock through the conjoint act of the passenger treadle and an operator, and means for locking the door against closing as long as a passenger is on the treadle and as long as the operator's door opening releasing means have not been moved into door locking position.

In testimony whereof I have hereunto set my hand this 5th day of January, A. D. 1925.

HAROLD ROWNTREE.